(12) United States Patent
Rider et al.

(10) Patent No.: US 10,545,536 B2
(45) Date of Patent: Jan. 28, 2020

(54) FACILITATING DYNAMIC DETECTION AND INTELLIGENT USE OF SEGMENTATION ON FLEXIBLE DISPLAY SCREENS

(71) Applicant: Intel Corporation, Santa Clara, CA (US)

(72) Inventors: Tomer Rider, Naahryia (IL); Ramon C. Olmo, Hillsboro, OR (US); Dor Levy, Jerusalem (IL); Shahar Taite, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/561,453

(22) PCT Filed: Feb. 9, 2016

(86) PCT No.: PCT/US2016/017182
§ 371 (c)(1),
(2) Date: Sep. 25, 2017

(87) PCT Pub. No.: WO2016/153612
PCT Pub. Date: Sep. 29, 2016

(65) Prior Publication Data
US 2018/0120902 A1    May 3, 2018

Related U.S. Application Data

(63) Continuation of application No. 14/668,664, filed on Mar. 25, 2015, now Pat. No. 9,727,087.

(51) Int. Cl.
*G06F 1/16* (2006.01)
(52) U.S. Cl.
CPC ............ *G06F 1/1652* (2013.01); *G06F 1/163* (2013.01); *G06F 2203/04102* (2013.01); *G06F 2203/04803* (2013.01)

(58) Field of Classification Search
CPC ......... G06F 3/0412; G06F 2203/04102; G06F 2203/04803; G06F 1/163; G06F 1/1652
(Continued)

(56) References Cited

U.S. PATENT DOCUMENTS

2010/0056223 A1    3/2010    Choi et al.
2010/0164888 A1    7/2010    Okumura et al.
(Continued)

FOREIGN PATENT DOCUMENTS

EP    2546720    1/2013

OTHER PUBLICATIONS

International Search Authority, "Written Opinion," issued in connection with application No. PCT/US2016/017182, dated May 13, 2016, 8 pages.
(Continued)

*Primary Examiner* — Michael Pervan
(74) *Attorney, Agent, or Firm* — Hanley, Flight & Zimmerman, LLC

(57) ABSTRACT

A mechanism is described for facilitating dynamic detection and intelligent use of segmentation on flexible display screens according to one embodiment. A method of embodiments, as described herein, includes detecting, via one or more touch sensors, alterations in current in and around one or more areas of a flexible display screen, where the alterations represent pressure being applied to cause at least one of bending, rolling, and curving of the flexible display screen at the one or more areas. The method may further include dividing the flexible display screen into a plurality of zones corresponding to the one or more areas, where the marking/dividing logic is further to mark a plurality of portions of the plurality of zones to serve as a plurality of
(Continued)

segments. The method may further include facilitating displaying of contents via the plurality of segments of the flexible display screen.

20 Claims, 8 Drawing Sheets

(58) Field of Classification Search
USPC .................. 178/18.01–19.07; 345/173–178
See application file for complete search history.

(56) References Cited

U.S. PATENT DOCUMENTS

| | | |
|---|---|---|
| 2012/0306929 A1 | 12/2012 | Chalkov |
| 2013/0176248 A1 | 7/2013 | Shin et al. |
| 2014/0035869 A1 | 2/2014 | Yun et al. |
| 2014/0240264 A1 | 8/2014 | Im et al. |
| 2014/0306908 A1* | 10/2014 | Nagaraju .............. G06F 3/0416 345/173 |
| 2015/0185781 A1* | 7/2015 | Yu ........................ G06F 1/1652 345/173 |
| 2015/0296062 A1 | 10/2015 | Lee |

OTHER PUBLICATIONS

United States Patent and Trademark Office, "Non-Final Office Action," issued in connection with U.S. Appl. No. 14/668,664, dated Jun. 3, 2016, 9 pages.

United States Patent and Trademark Office, "Final Office Action," issued in connection with U.S. Appl. No. 14/668,664, dated Dec. 9, 2016, 10 pages.

United States Patent and Trademark Office, "Notice of Allowance," issued in connection with U.S. Appl. No. 14/668,664, dated Apr. 21, 2017, 9 pages.

International Search Authority, "International Search Report," issued in connection with application No. PCT/US2016/017182, dated May 13, 2016, 3 pages.

* cited by examiner

FACILITATING DYNAMIC DETECTION AND INTELLIGENT USE OF SEGMENTATION ON FLEXIBLE DISPLAY SCREENS

RELATED APPLICATIONS

This patent is a § 371 National Stage application of PCT Application Serial No. PCT/US16/17182, filed Feb. 9, 2016, which is a continuation of U.S. patent application Ser. No. 14/668,664, filed Mar. 25, 2015, and granted as U.S. Pat. No. 9,727,087 on Aug. 8, 2017. PCT Application Serial No. PCT/US16/17182 and U.S. Pat. No. 9,727,087 are hereby incorporated by reference in their entireties.

FIELD

Embodiments described herein generally relate to computers. More particularly, embodiments relate to facilitating dynamic detection and intelligent use of segmentation on flexible display screens.

BACKGROUND

With the growth in computing technology, display screens, including flexible display screens, are also gaining popularity and noticeable traction in becoming a mainstream technology as seen being employed in various devices, such as televisions, wearable devices, smartphones, tablet computers, etc., and even as standalone flexible displays. However, conventional techniques treat flexible displays as single displays and are severely limited in their application.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for proactively identifying various curves and bends on a flexible display screen (also referred to as "flexible screen" or "flexible display") to dynamically segment the flexible screen into multiple areas with each area serving as a screen, enabling multiple new user interfaces and experiences on the single flexible screen in its different states. In one embodiment, a single flexible screen may be used as having different display areas providing different contents by proactively detecting and using the flexible screen's various curves and bends.

Figure 1:
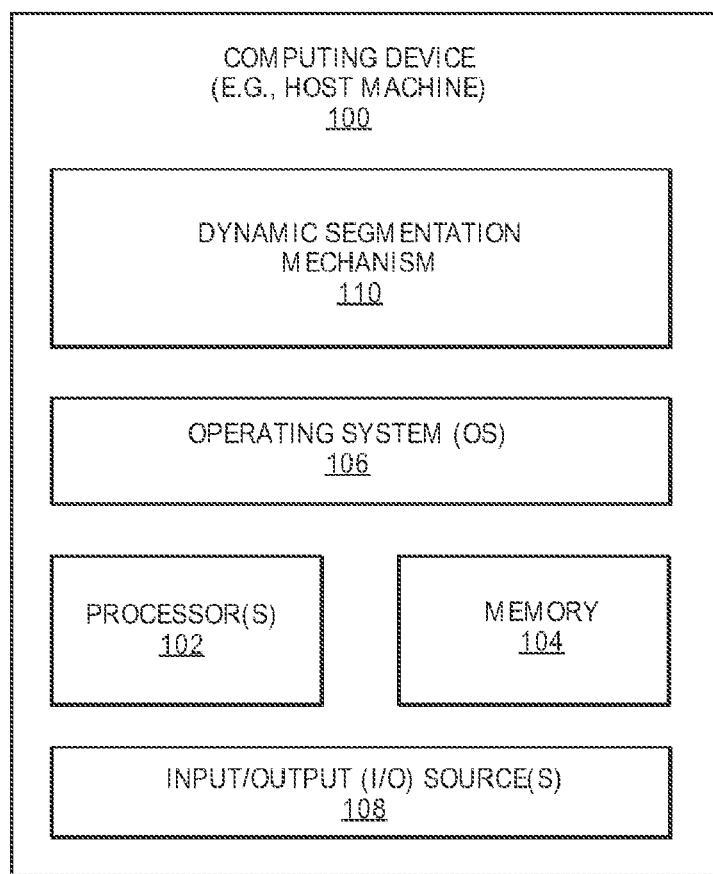
FIG. 1 illustrates a computing device employing a dynamic segmentation mechanism according to one embodiment.

FIG. 1 illustrates a computing device 100 employing a dynamic segmentation mechanism 110 according to one embodiment. Computing device 100 servers a host machine for hosting dynamic segmentation mechanism ("segmentation mechanism") 110 that may include any number and type of components, as illustrated in FIG. 2, to facilitate detection and use of segmentations in flexile display screens as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, smart windshields, smart windows, head-mounted displays (HMDs) (e.g., optical head-mounted display (e.g., wearable glasses, head-mounted binoculars, gaming displays, military headwear, etc.), and other wearable devices (e.g., smartwatches, bracelets, smartcards, jewelry, clothing items, etc.), etc.

It is contemplated and to be noted that embodiments are not limited to computing device 100 and that embodiments may be applied to and used with any form or type glass that is used for viewing purposes, such as smart windshields, smart windows (e.g., smart window by Samsung®, etc.), and/or the like. Similarly, it is contemplated and to be noted that embodiments are not limited to any particular type of computing device and that embodiments may be applied and used with any number and type of computing devices; however, throughout this document, the focus of the discussion may remain on wearable devices, such as wearable glasses, etc., which are used as examples for brevity, clarity, and ease of understanding.

In some embodiments, computing device 100 may include a large(r) computing system (e.g., server computer, desktop computer, laptop computer, etc.), such that a flexible display screen may be part of this large(r) computing system where the flexible display screen may be a part or an extension screen of a main display screen, where the main screen itself may be flexible or static.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as one or more touchable and/or non-touchable flexible display screen(s) (e.g., rolling screens, bendable screens, curving screens, etc.), touchscreens, touch panels, touch pads, virtual or regular keyboards, virtual or regular mice, etc. A touchable and/or non-touchable flexible display screen may be the same as or similar to flexible display screens 230A, 230B, 230C, 230D, and 230E of FIGS. 2A, 2B, 2C, 2D and 2E, respectively.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a group of individuals using or having access to computing device 100.

Figure 2A:
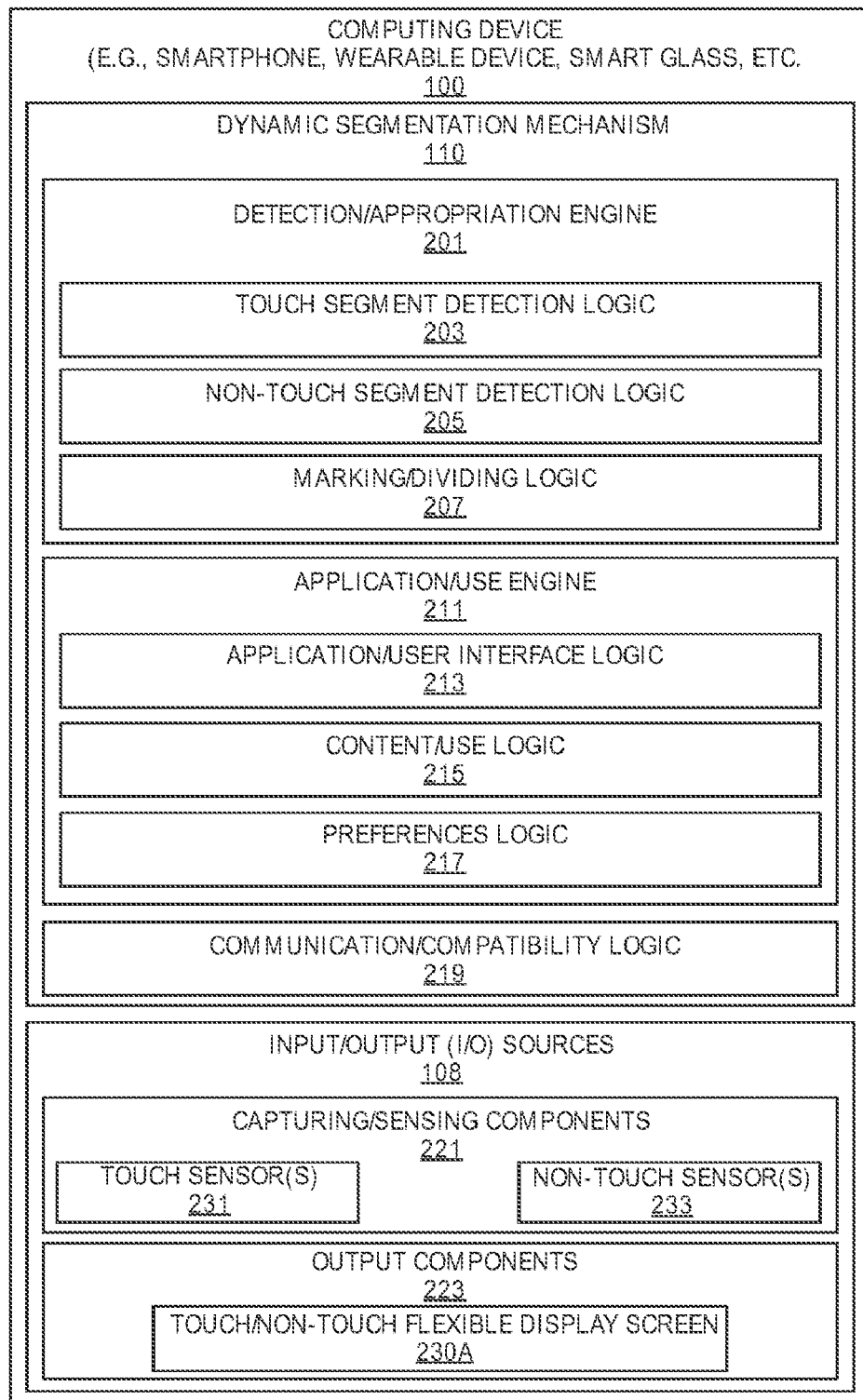
FIG. 2A illustrates a dynamic segmentation mechanism according to one embodiment.

FIG. 2A illustrates a dynamic segmentation mechanism 110 according to one embodiment. In one embodiment, segmentation mechanism 110 may include any number and type of components, such as (without limitation): detection/appropriation engine 201 including touch segment detection logic ("touch logic") 203, non-touch segment detection logic ("non-touch logic") 205, and marking/dividing logic 207; application/use engine 211 including activation/user interface logic 213 and content/use logic 215; preferences logic 217; and communication/compatibility logic 219.

Computing device 100 (e.g., handheld device, wearable device, smart window, etc.) may further include any number and type of other components, such as capturing/sensing components 221 (e.g., capacitor touch sensors ("touch sensors") 231, current delta non-touch sensors ("non-touch sensors") 233 (e.g., delta-sigma modulator, etc.), cameras, microphones, etc.), output components 223 (e.g., touch/non-touch flexible display screen 230A, such as rolling screen, bendable screen, curving screen, etc.), etc.

It is contemplated that flexible screen 230A may not be part of computing device 100 and that it may be a standalone display screen and may be in communication with computing device 100. For example and in one embodiment, computing device 100 may be a smart window or a handheld device having flexible display screen 235 that may include one or more of a rolling screen that is capable of being rolled in or more ways, bendable screen that is capable of being bent in one or more ways, curving screens that can be curved in one or more ways, etc., and further, flexible display screen 230A may be a touch screen or a non-touch screen.

As aforementioned with reference to FIG. 1, in some embodiments, computing device 100 may include a large(r) computing system (e.g., server computer, desktop computer, laptop computer, etc.), such that flexible display screen 230A may be part of this large(r) computing system where flexible display screen 230A may be a part or an extension screen of a main display screen, where the main screen itself may be flexible or static.

Further, for example and in one embodiment, capturing/sensing components 221 may include any number and type of components, such as touch sensors 231, non-touch sensors 233, cameras, microphones, etc., for performing detection and sensing tasks for segmentation of flexible screen 230A of output components 223 as will be further described below.

Capturing/sensing components 221 may further include any number and type of capturing/sensing devices, such as one or more sending and/or capturing devices (e.g., cameras, microphones, biometric sensors, chemical detectors, signal detectors, wave detectors, force sensors (e.g., accelerometers), illuminators, etc.) that may be used for capturing any amount and type of visual data, such as images (e.g., photos, videos, movies, audio/video streams, etc.), and non-visual data, such as audio streams (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), environmental/weather conditions, maps, etc. It is contemplated that "sensor" and "detector" may be referenced interchangeably throughout this document. It is further contemplated that one or more capturing/sensing components 221 may further include one or more supporting or supplemental devices for capturing and/or sensing of data, such as illuminators (e.g., infrared (IR) illuminator), light fixtures, generators, sound blockers, etc.

It is further contemplated that in one embodiment, capturing/sensing components 221 may further include any number and type of sensing devices or sensors (e.g., linear accelerometer) for sensing or detecting any number and type of contexts (e.g., estimating horizon, linear acceleration, etc., relating to a mobile computing device, etc.). For example, capturing/sensing components 221 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

For example, capturing/sensing components 221 may further include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc.

Computing device 100 may further include one or more output components 223 to remain in communication with one or more capturing/sensing components 221 and one or more components of segmentation mechanism 110 to facilitate displaying of images, playing or visualization of sounds, displaying visualization of fingerprints, presenting visualization of touch, smell, and/or other sense-related experiences, etc. For example and in one embodiment, output components 223 may include (without limitation) one or more of light sources, display devices or screens, audio speakers, bone conducting speakers, olfactory or smell visual and/or non/visual presentation devices, haptic or touch visual and/or non-visual presentation devices, animation display devices, biometric display devices, X-ray display devices, etc.

Computing device 100 may be in communication with one or more repositories or databases over one or more networks, where any amount and type of data (e.g., real-time data, historical contents, metadata, resources, policies, criteria, rules and regulations, upgrades, etc.) may be stored and maintained. Similarly, computing device 100 may be in communication with any number and type of other computing devices, such as HMDs, wearable devices, smart windows, mobile computers (e.g., smartphone, a tablet computer, etc.), desktop computers, laptop computers, etc., over one or more networks (e.g., cloud network, the Internet, intranet, Internet of Things ("IoT"), proximity network, Bluetooth, etc.).

It is contemplated that computing device 100 may include one or more software applications (e.g., device applications, hardware components applications, business/social application, websites, etc.) in communication with segmentation mechanism 110, where a software application may offer one or more user interfaces (e.g., web user interface (WUI), graphical user interface (GUI), touchscreen, etc.) to work with and/or facilitate one or more operations or functionalities of segmentation mechanism 110.

In one embodiment, computing device 100 may include a flexible display screen-based device, such as a handheld device, a wearable device, a smart windows, laptop computer, desktop computer, etc., having at least one flexible display screen which may be touchable or non-touchable. Further, flexible display screen 230A may be of any size, such as a micro-screen mounted on a smartcard or a smart bracelet to a very large screen that is wall-mounted or billboard-mounted, etc., based on any number and type of techniques or technologies, such as (without limitation) electrochromic, photochromic, thermochromic, or suspended particles, etc. It is contemplated and to be noted that embodiments are not limited to any particular number and type of flexible screen 230A being standalone or device-based, small or large, single layered or block of layers, or depending on any particular type or form of technology, etc.

In one embodiment, as illustrated, segmentation mechanism 110 includes detection/appropriation engine 201 for facilitated sensing and detection of one or more segments of flexible screen 230A by identifying any number of curves and bends using one or more components, such as touch logic 203, non-touch logic 205, marking/dividing logic 207, touch sensor 231, and non-touch sensor 233.

In one embodiment, in case of flexible screen 230A being a touch-based screen, touch logic 203 may be used to facilitate touch sensor 231 to detect any changes in the running charge of flexible screen 230A at an axis when flexible screen is bent (rolled or curved) at the axis, because when flexible screen 230A is bent at a certain axis, the charge around that axis is altered. For example, under normal circumstances, such as when flexible screen 230A remains unbent, the polarity charge of flexible screen 230A continues to run in constant current streams until flexible screen 230A is bent at an axis which can lead to changes in pixel proximity around the axis area which further leads to differences or modifications in the current around that axis area. In one embodiment, as aforementioned, touch logic 203 facilitates touch sensor 231 to detect and identify such changes in the current or charges around the axis area of flexible screen 230A.

In another embodiment, in case of flexible screen 230A being a non-touch screen, non-touch logic 205 may be used to facilitate non-touch sensor 233 to track and extract any indication of flexible screen 230A being bent (rolled or curved) by measuring small current changes over a period of time in a specific area of flexible screen 230A, where specific area includes an axis area at which flexible screen 230A is bent. For example, the change in the current may indicate screen bending of flexible screen 230A around an axis by measuring charge differences on the bent axis as facilitated by non-touch logic 205 using non-touch sensor 233.

It is contemplated that embodiments are not merely limited to "bending" and that flexible screen 230A may be "rolled" or "curved, as desired or necessitated, and that "bending" is mentioned throughout this document as an example for brevity, clarity, and ease of understanding.

Once any bends, rolls, and/or curves on flexible screen 230A are detected and measured by touch logic 203 and non-touch logic 205 using touch sensor 231 and non-sensor 233, respectively, any data or information obtained from these detections and measurements is forwarded on to marking/dividing logic 207 for further processing. For example, touch logic 203, via touch sensor 231, may detect and measure any changes in the charges around one or more axis areas due to changes in screen pixel proximity in those axis areas which is caused by bending of touch-based flexible screen 230A. This measurement data is then forwarded on to marking/dividing logic 207 to be used to divide flexible screen 230A at locations corresponding to the identified axis areas as multiple zones, where these zones are then marked as parts or segments to then be used as separate display screens for displaying different contents on flexible screen 230A.

Similarly, for example, non-touch logic 205, via non-touch sensor 233, may detect and measure any differences or changes in the current charge, over time, around specific areas. This measurement technique includes using non-touch sensor 233 for extraction of small changes in current charges as detected in one or more specific areas over a period of time and continuously measuring any differences detected between previous charges and current charges to identify and regard the one or more specific areas as bend areas or axis areas. This measure of axis areas is used by marking/dividing logic 207 to divide flexible screen 230A at locations corresponding to the identified axis areas as multiple zones, where these zones are then marked as parts or segments to then be used as separate display screens for displaying different contents on flexible screen 230A.

In one embodiment, activation/user interface logic 213 of application/use engine 211 may be used to activate the divided and marked segment activating these segments as displays and assigning them their user interfaces. As further illustrated with respect to FIGS. 2B-2E, each segment of flexible screen 230A may be used as a separate display screen capable of providing content that may be distinct and different from the contents provided through other segments of flexible screen 230A. For example, if flexible screen 230A is bent and divided into two segments, one of the two segments may display a website showing local weather details, while the other segment may show a video relating to the local weather or something entirely different, such as a sports website, a television news channel, a movie, etc., or it may simply be left blank or turned off.

In one embodiment, activation/user interface logic 213 activates each segment to enable it to display content and further, activation/user interface logic 213 assigns a separate user interface to each segment to allow it to play content that may be distinguished from contents of other segments on the same flexible screen 230A. Moreover, in one embodiment, content/use logic 215 may be used to facilitate each segment to provide it content through its assigned user interface. For example, upon having the segments activated and assigned their corresponding interfaces by activation/user interface 213, each segment may then be facilitated to accept any amount and type of content and with the ability to display the content as facilitated by content/use logic 215.

As aforementioned, it is contemplated and to be noted that although "bending" of flexible screen 230A is used throughout this document, embodiments are not limited as such and that forms of pressure, such as "curving", "rolling", etc., of flexible screen 230A may also be applied and performed for achieving segmentation of flexible screen 230A as facilitated by segmentation mechanism 110 and as described above.

In one embodiment, segmentation mechanism 110 further includes preference logic 217 to allow a user of computing device 100 to set their own preferences on how they wish to uses the multiple segments of flexible screen 230A. For example, in one embodiment, the user may choose to predefine or preset the different types or categories of contents they wish to have displayed on different segments of flexible screen 110. For example, a user who is an investor or works in the finance industry may wish to have the stock market numbers displayed at all time on the right segment or curve of flexible screen 230A, and/or the like. Similarly, the user may wish to have family photos along with current time and weather displayed at all time on the left segment or curve of flexible screen 230A, and/or the like. In some embodiment, users may wish to have all segments display a single content, such as a movie, etc., such as having portions of a single movie screen collectively displayed using multiple segments (e.g., cut the movie screen or a picture or a website content in six portions to be displayed by six segments of flexible screen 230A).

In one embodiment, the user may access a user interface on computing device 100 to set any type of preferences or personal settings that may then be taken into consideration and applied by segmentation mechanism 110. Further, it is contemplated that embodiments are not limited to any of the preferences described above and that users may choose to set and reset any number and type of personal settings, as desired or necessitated.

In one embodiment and for example, content/use logic 215, in working with activation/user interface logic 213 and preferences logic 217, allows for interaction and communication between two or more segments, allowing the user to efficiently perform multiple tasks (referred to as "multitasking") based on user preferences. Similarly, in case of computing device 100 being a smartphone with bending abilities, computing device 100 and flexible screen 112 may be bent such that content/use logic 215, based on the user's preference settings, may allow for dividing different widgets on each segment of multiple segments of flexible screen230A.

Further, as illustrated with reference to FIG. 2E, segmentation of flexible screen 230A may further allow for partitioning of flexible screen 230A into different segments providing additional screens which may be extremely valuable in certain activities, such as gaming. For example, using user preferences as determined by preference logic 217 and as facilitated by content/use logic 215, in case of a war game, one segment may display the game and its progression, while another segment may display weapons menu to efficiently and easily control and play the game.

In one embodiment, in performing proactive detection of bending, rolling, curving, etc., of flexible screen 230A using segmentation logic 110, any premature or accidental bending, rolling, curving, etc., of flexible screen 230A or computing device 100 may be supervised, timely detected, and communicated, via communication/compatibility logic 219, to the user via user interface at computing device 100. This way the user may be warned and computing device 100 may be protected. In one embodiment, as aforementioned, flexible screen 230A may be curved or rolled along with being bent and as such, flexible screen 230A and its segments may be used to zoom-in and zoom-out of content by, for example, dynamically alternatively curving flexible screen 230A between convex state and concave state. It is contemplated that embodiments are not merely limited to any of the examples discussed above, but that any number and type of settings, triggering events, etc., may be set or reset by user, via preferences logic 217, to correlate with a display event, such as increasing or decreasing volume on a screen flex event.

Communication/compatibility logic 219 may be used to facilitate dynamic communication and compatibility between computing device 100 and any number and type of other computing devices (such as wearable computing devices, mobile computing devices, desktop computers, server computing devices, etc.), processing devices (e.g., central processing unit (CPU), graphics processing unit (GPU), etc.), capturing/sensing components 221 (e.g., capacitor touch sensors, current delta sensors, non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, databases and/or data sources (such as data storage devices, hard drives, solid-state drives, hard disks, memory cards or devices, memory circuits, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "flexible display screen", "flexible screen", "segmentation", "segment", "zone", "bend", "roll", "curve", "touch", "non-touch", "smart glass", "wearable device", etc., should not be read to limit embodiments to software or devices that carry that label in products or in literature external to this document.

It is contemplated that any number and type of components may be added to and/or removed from segmentation mechanism 110 to facilitate various embodiments including adding, removing, and/or enhancing certain features. For brevity, clarity, and ease of understanding of segmentation mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
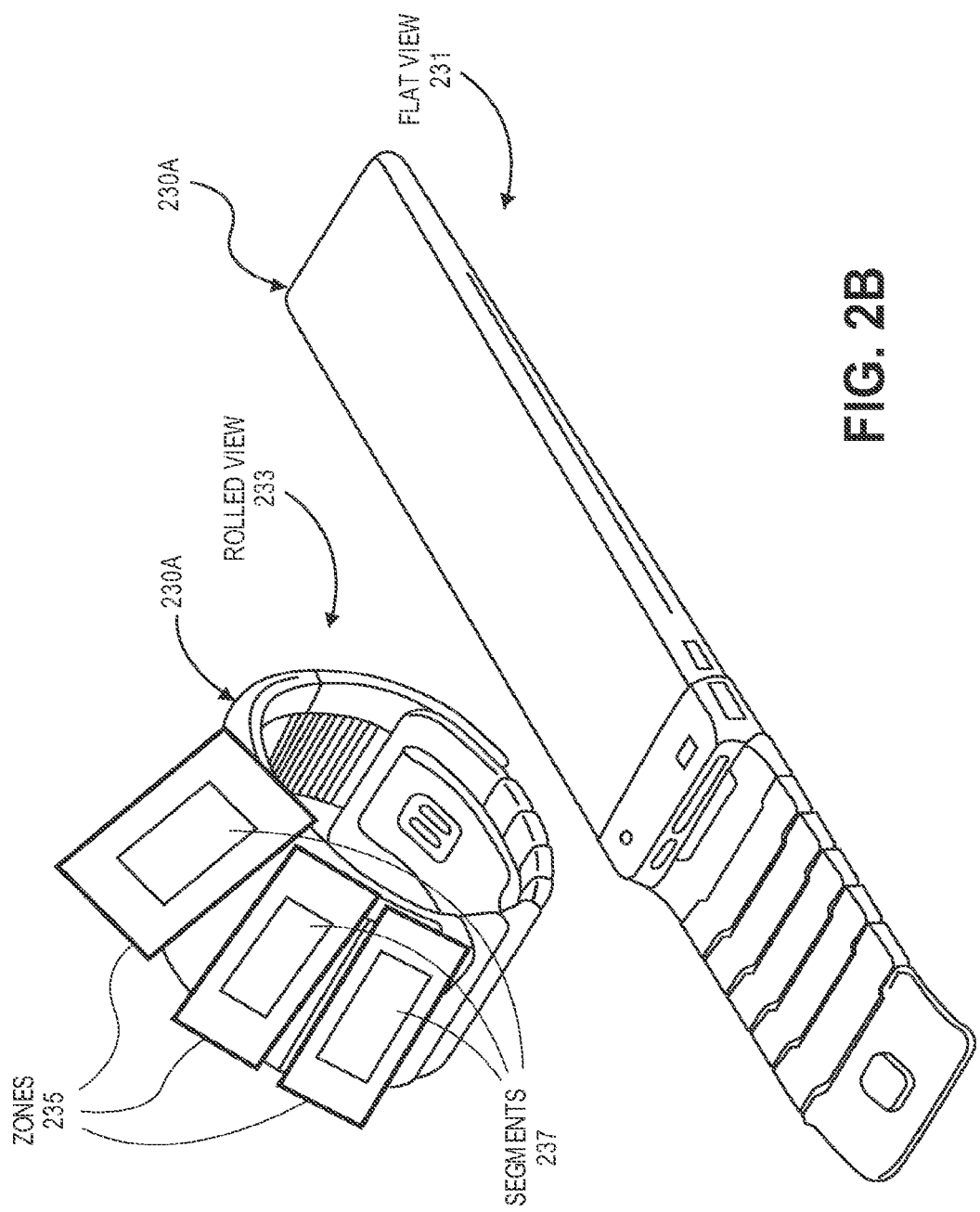
FIG. 2B illustrates a flexible display screen according to one embodiment.

FIG. 2B illustrates a flexible display screen 230B according to one embodiment. As an initial mater, for the sake of brevity, clarity, and ease of understanding, many of the processes and components discussed above with respect to FIGS. 1-2A may not be discussed or repeated hereafter, such as with respect to FIGS. 2B-5. Further, it is contemplated and to be noted that flexible display screens 230B, 230C, 230D, and 230E of FIGS. 2B, 2C, 2D, and 2E, respectively, may be the same as or similar to flexible display screen 230A of FIG. 2A and that this contemplation may not be repeated hereafter.

The illustrated embodiment of flexible screen 230B includes a rolling or rollable flexible screen (e.g., smart bracelet, smartwatch, etc.) that is shown in two different views, such as flat view 231 and rolled view 233. In flat view 231, flexible screen 230B is shown in its basic or original state which, as shown in rolled view 233, is then rolled into a circular shape like a watch or a bracelet, etc. As previously described with reference to FIG. 2A, various bending, curving, and rolling areas on flexible screen 230B may be detected and measured to lead to identification of multiple viewing zones 235 that are then marked as segments 237 to serve as multiple display screens (showing any amount and type of contents) using a single flexible screen 230B. As aforementioned with respect to FIG. 2A, these multiple segments 237 may be used in any number of ways, such as serving as interactive display screens to allow for multitasking, gaming, etc.

Figure 2C:
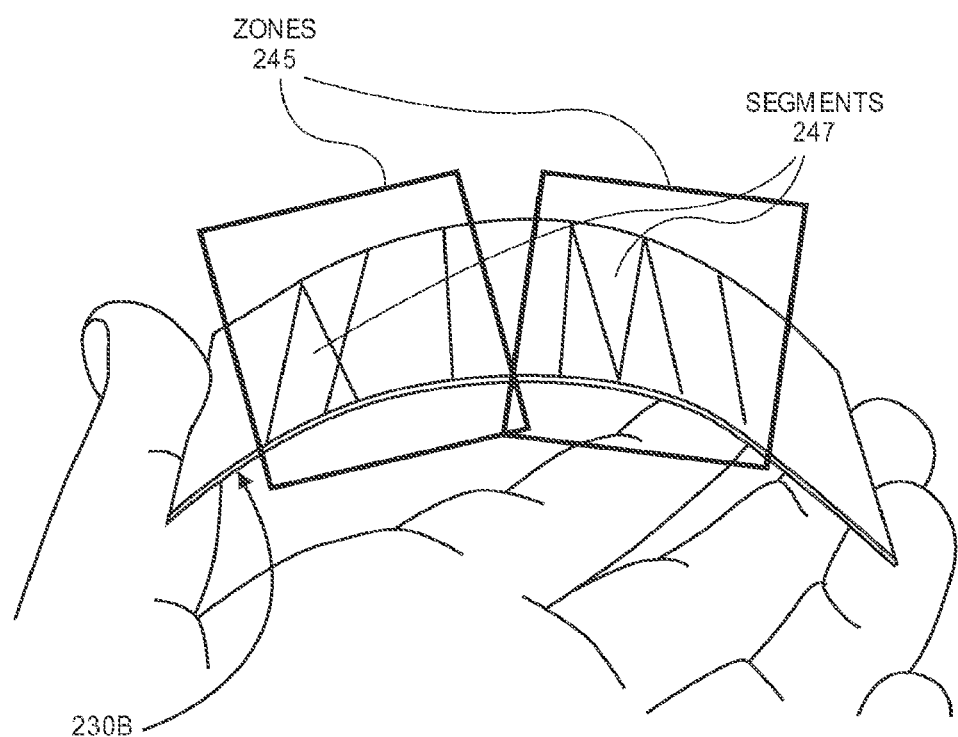
FIG. 2C illustrates a flexible display screen according to one embodiment.

FIG. 2C illustrates a flexible display screen 230C according to one embodiment. The illustrated embodiment of flexible screen 230C includes a curving or curve-able flexible screen (e.g., smart bangles, curving strips, etc.) that is shown in a curved state that may be obtained from pressuring at both ends of flexible screen 230C. In curving flexible screen 230C, a couple of viewing zones 245 and their corresponding segments 247 on flexible screen 230C are obtained and used as previously discussed with reference to FIG. 2A.

Figure 2D:
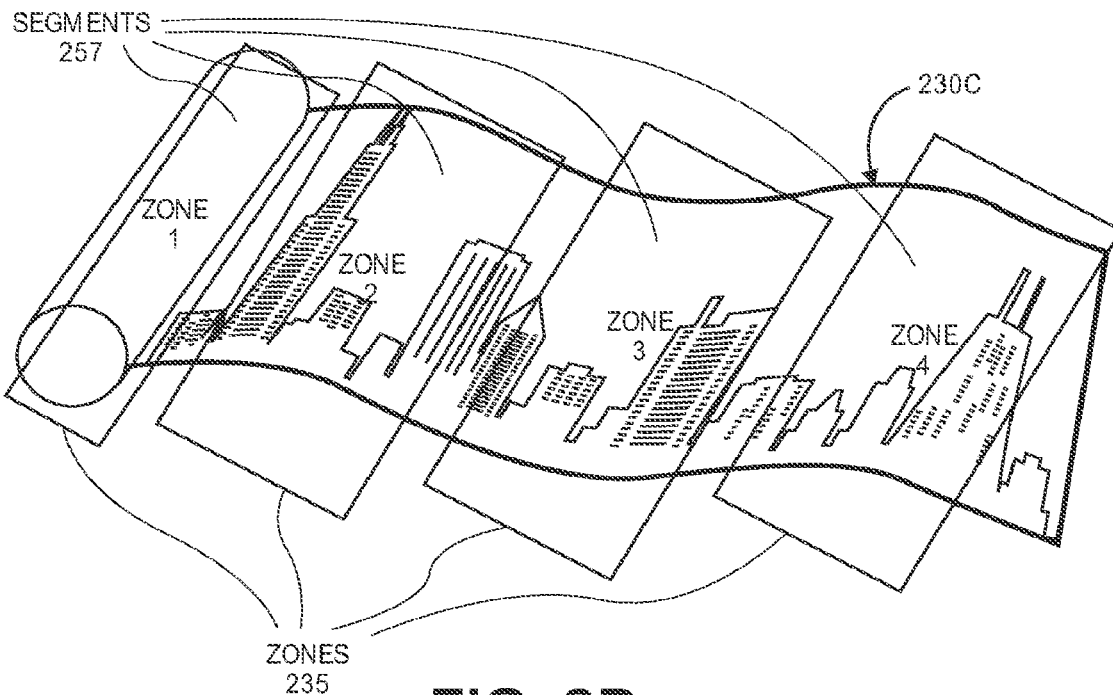
FIG. 2D illustrates a flexible display screen according to one embodiment.

FIG. 2D illustrates a flexible display screen 230D according to one embodiment. The illustrated embodiment of flexible screen 230D includes another rolling or rollable flexible screen that is shown in a wavy state that may be obtained from pressuring at various parts of flexible screen 230D. In waving flexible screen 230D, multiple viewing zones 245 of various sizes (e.g., zone 1 is smaller than zones 2-4) and their corresponding segments 247 on flexible screen 230C are obtained and used as previously discussed with reference to FIG. 2A.

Figure 2E:
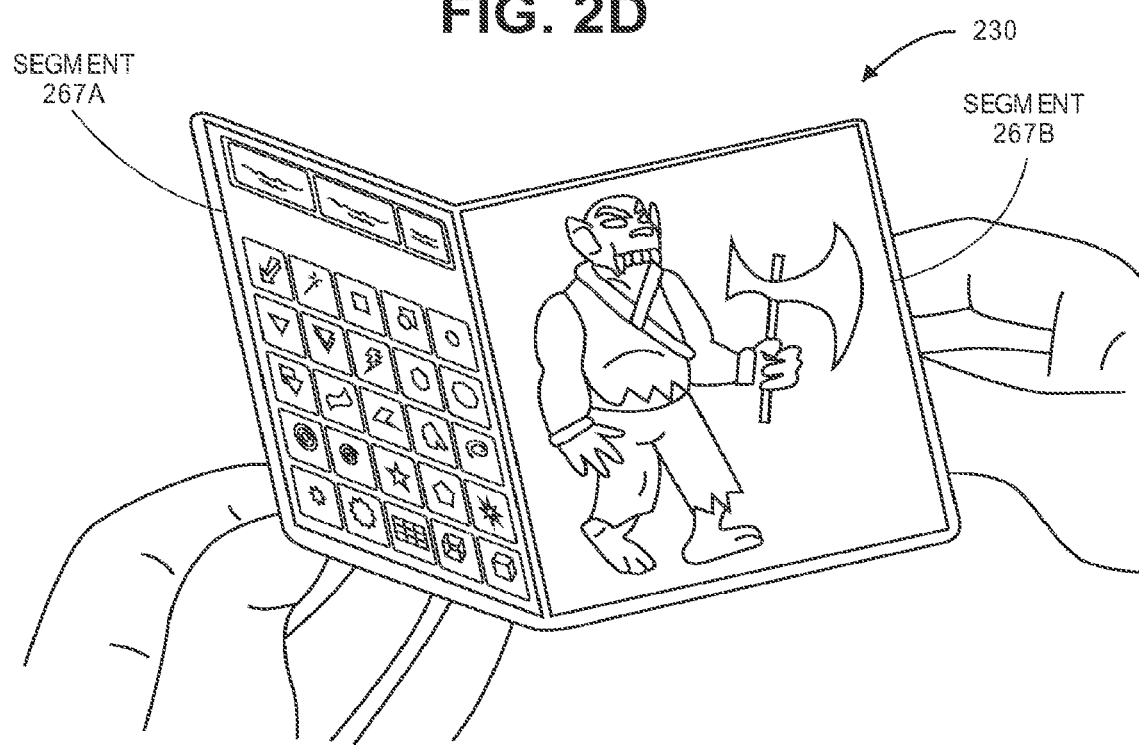
FIG. 2E illustrates a flexible display screen according to one embodiment.

FIG. 2E illustrates a flexible display screen 230E according to one embodiment. The illustrated embodiment of flexible screen 230E includes a bending or bendable flexible screen that is shown in a bended state that may be obtained from pressuring in the middle and/or the two ends of flexible screen 230E. As illustrated, in bending flexible screen 230E, two segments 267A-B are obtained as previously discussed with reference to FIG. 2A. In one embodiment, as illustrated, segments 267A-B are used for gaming purposes, where segment 267A is used as a weapons screen, while segment 267B is used as a gameplay screen.

Figure 3:
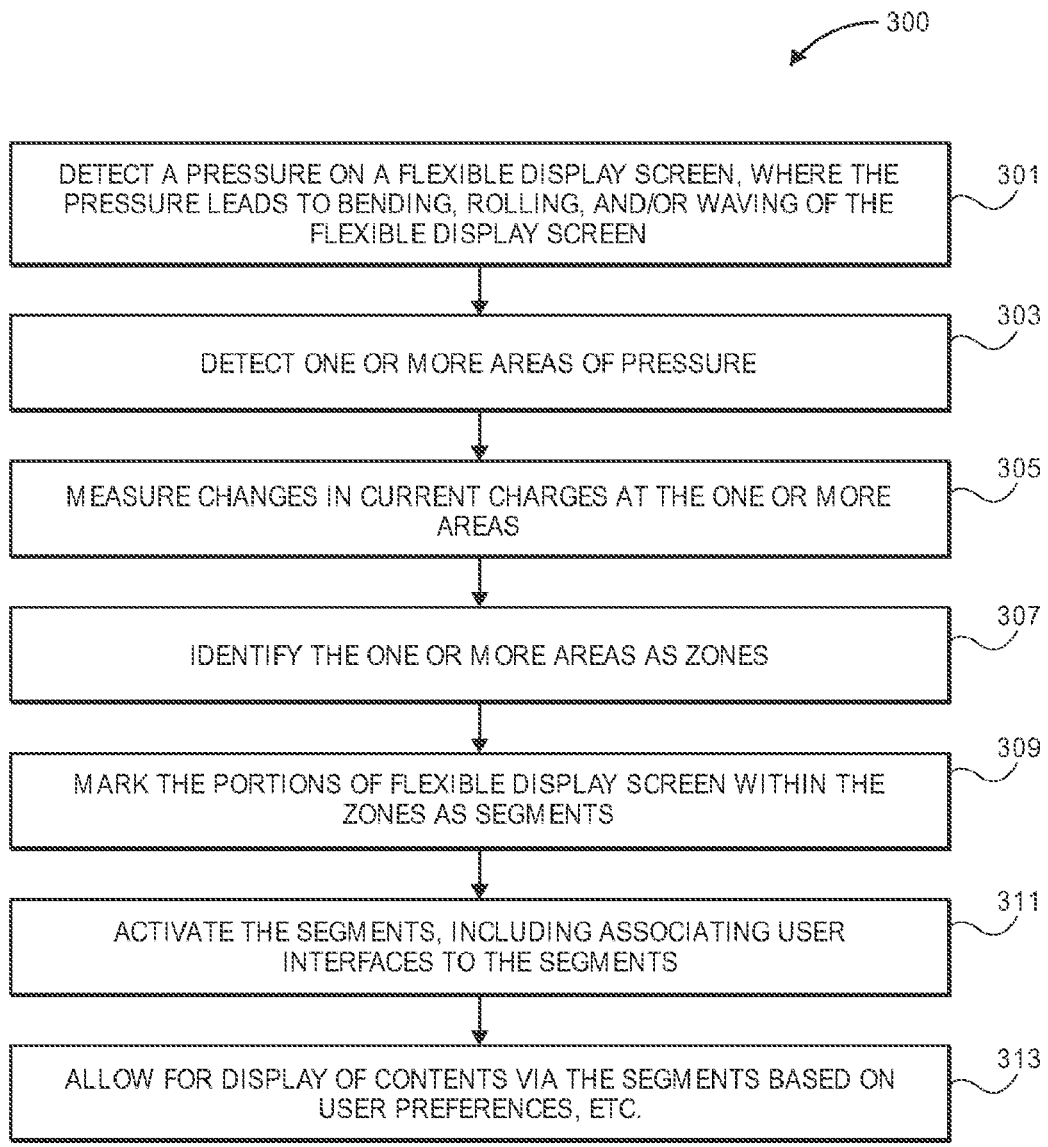
FIG. 3 illustrates a method for facilitating dynamic segmentation and intelligent use of segmentation on flexible display screens according to one embodiment.

FIG. 3 illustrates a method 300 for facilitating dynamic segmentation and intelligent use of segmentation on flexible display screens according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by segmentation mechanism 110 of FIGS. 1-2A. The processes of method 300 are illustrated in linear sequences for brevity and clarity in presentation; however, it is contemplated that any number of them can be performed in parallel, asynchronously, or in different orders. For brevity, many of the details discussed with reference to FIGS. 1 and 2A-E may not be discussed or repeated hereafter.

Method 300 begins at block 301 with detecting pressure on a flexible display screen, where the pressure leads to bending, rolling, and/or curving of the flexible display screen. At block 303, one or more areas of pressure are detected and, at block 305, changes in current charges at the one or more axis areas are measured. As described with reference to FIG. 2A, in one embodiment, in case of the flexible screen being a touch screen, touch logic 203 may be used to facilitate one or more touch sensor(s) 231 (e.g., touch capacitor sensors) detect and identify any changes in the current charge around the one or more axis areas where the bending, rolling, and/or curving of the flexible screen takes place, such as when the pixel proximity of the flexible screen changes around these one or more axis areas due to at least one of bending, rolling, and/or curving of the flexible screen. In one embodiment, touch logic 203 may further facilitate the one or more touch sensor(s) 231 (e.g., touch capacitor sensors) of FIG. 2A to measure these changes or differences in the current charges around the one or more axis areas to, for example, determine capacitance or change in capacitance of the one or more axis areas.

Similarly, as further described with reference to FIG. 2A, non-touch logic 205 may be used to facilitate one or more non-touch sensor(s) 233 (e.g., current delta sensors) to detect and extract current changes in and around one or more specific areas (e.g., axis areas) of the flexible screen over a period of time seeking an indication of at least one of bending, rolling, and/or curving of the flexible display screen. In one embodiment, as described with reference to FIG. 2A, non-touch logic 205 may be further used to facilitate non-touch sensor(s) 233 (e.g., current delta sensors) to measure any changes in the current charges in and around the one or more specific areas of the flexible screen that indicates, for example, bending of the flexible screen, where this measuring includes detecting differences in charges by comparing one or more present current charges with one or more previous current charges over a period of time.

Referring back to method 300, in one embodiment, at block 307, the one or more areas are identified as zones and, at block 309, the positions of flexible display screen within the zones are marked as segments. At block 311, segments are activated, including associating user interfaces to the segments. At block 313, display of contents via the segments is allowed based on user preferences, etc.

Figure 4:
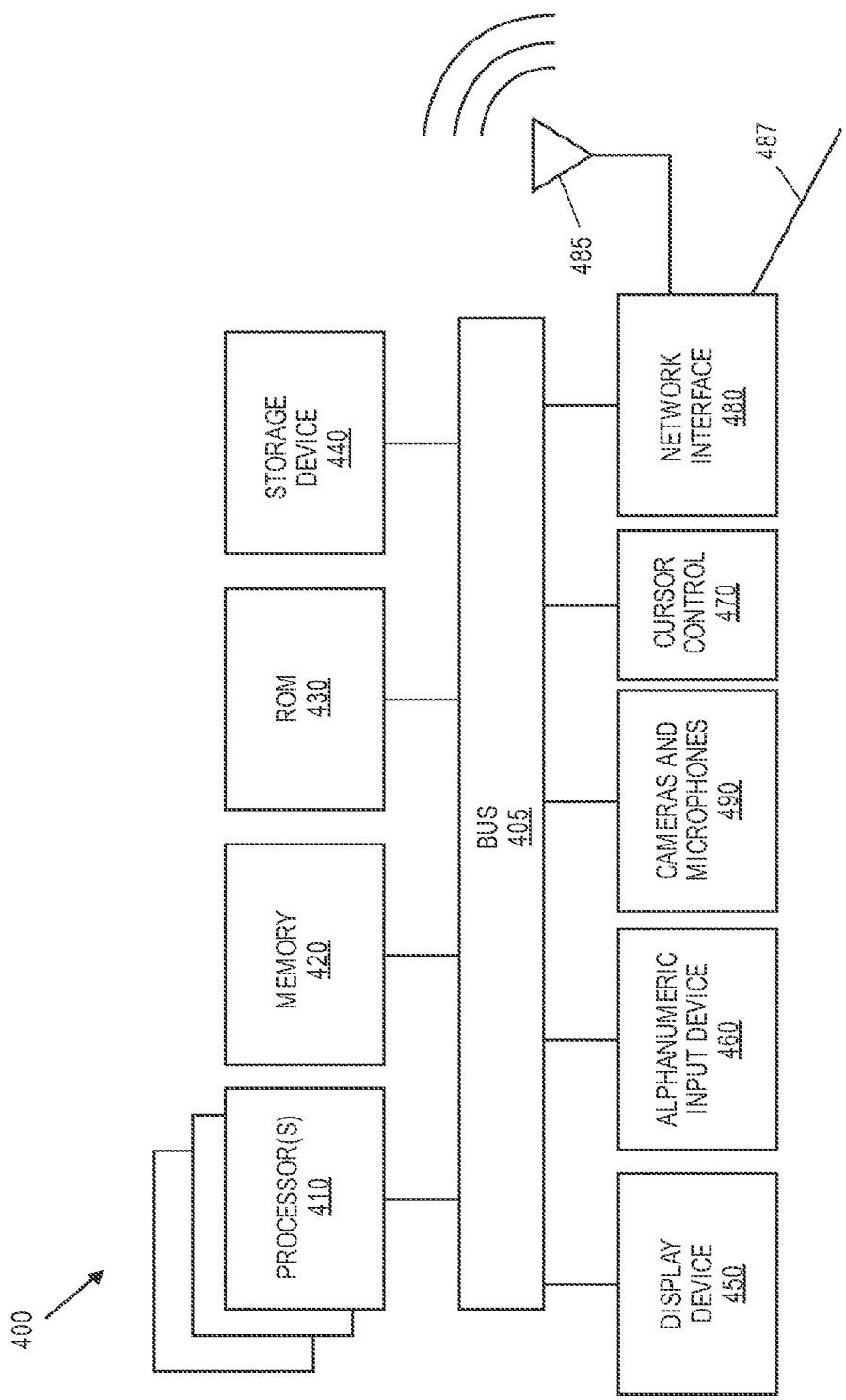
FIG. 4 illustrates computer system suitable for implementing embodiments of the present disclosure according to one embodiment.

FIG. 4 illustrates an embodiment of a computing system 400 capable of supporting the operations discussed above. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 400 may be the same as or similar to or include computing devices 100 described in reference to FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, it may include multiple processors and/or co-processors, such as one or more of central processors, image signal processors, graphics processors, and vision processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 5:
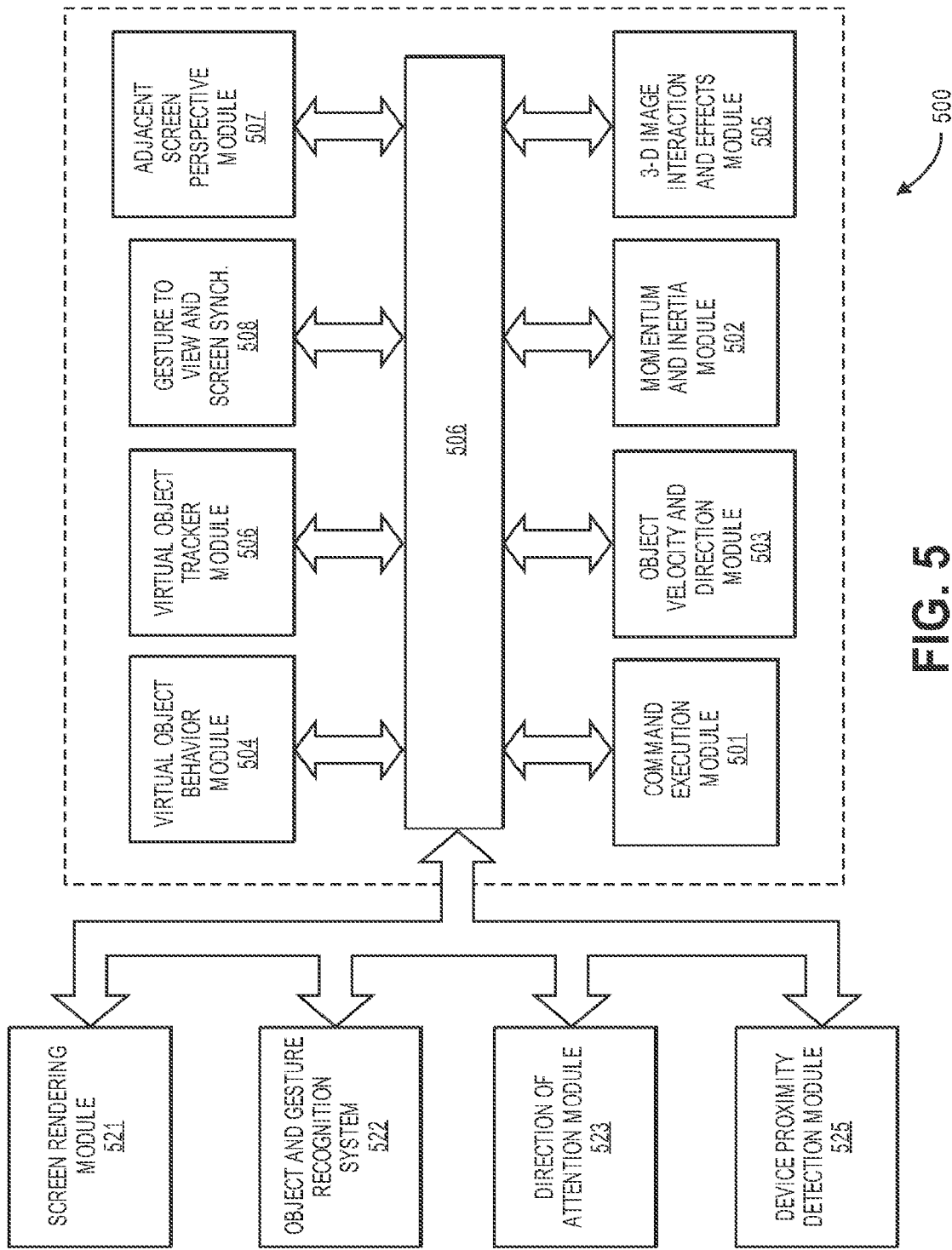
FIG. 5 illustrates computer environment suitable for implementing embodiments of the present disclosure according to one embodiment.

FIG. 5 illustrates an embodiment of a computing environment 500 capable of supporting the operations discussed above. The modules and systems can be implemented in a variety of different hardware architectures and form factors including that shown in FIG. 9.

The Command Execution Module 501 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 521 draws objects on the one or more multiple screens for the user to see. It can be adapted to receive the data from the Virtual Object Behavior Module 504, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 507, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 522 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 523 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 522 to ensure that the gestures or commands are associated with the appropriate library for the active display. Similarly, if the user is looking away from all of the screens, then commands can be ignored.

The Device Proximity Detection Module 525 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 522. For a display device, it may be considered by the Adjacent Screen Perspective Module 507.

The Virtual Object Behavior Module 504 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 506 on the other hand may be adapted to track where a virtual object should be located in three dimensional space in a vicinity of an display, and which body part of the user is holding the virtual object, based on input from the Object and Gesture Recognition Module. The Virtual Object Tracker Module 506 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 508, receives the selection of the view and screen or both from the Direction of Attention Module 523 and, in some cases, voice commands to determine which view is the active view and which screen is the active screen. It then causes the relevant gesture library to be loaded for the Object and Gesture Recognition System 522. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 507, which may include or be coupled to the Device Proximity Detection Module 525, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 507 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 503 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 502 can use image motion, image size, and angle changes of objects in the image plane or in a three-dimensional space to estimate the velocity and direction of objects in the space or on a display. The Momentum and Inertia Module is coupled to the Object and Gesture Recognition System 522 to estimate the velocity of gestures performed by hands, fingers, and other body parts and then to apply those estimates to determine momentum and velocities to virtual objects that are to be affected by the gesture.

The 3D Image Interaction and Effects Module 505 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic detection and intelligent use of segmentation on flexible display screens, comprising: a flexible display screen; touch segment detection logic to detect, via one or more touch sensors, alterations in current in and around one or more areas of the flexible display screen, wherein the alterations represent pressure being applied to cause at least one of bending, rolling, and curving of the flexible display screen at the one or more areas; marking/dividing logic to divide the flexible display screen into a plurality of zones corresponding to the one or more areas, wherein the marking/dividing logic is further to mark a plurality of portions of the plurality of zones to serve as a plurality of segments; and content/use logic to facilitate displaying of contents via the plurality of segments of the flexible display screen.

Example 2 includes the subject matter of Example 1, further comprising non-touch segment detection logic to detect, via one or more non-touch sensors, current charges, over a period of time, in and around the one or more areas of the flexible display screen, wherein the non-touch segment detection logic is further to measure gradual changes in the current charges over the period of time by detecting and comparing one or more present current charges with one or more previous current charges, wherein the gradual changes represent the applied pressure.

Example 3 includes the subject matter of Example 1 or 2, further comprising application/user interface logic to associate a plurality of user interface to the plurality of segments, wherein a user interface is associated with each of the plurality of segments, wherein the application/user interface logic is further to facilitate interactivity amongst the plurality of segments.

Example 4 includes the subject matter of Example 1, wherein each segment of the plurality of segments serves as a segment display screen on the flexible display screen, wherein the segment display screen is distinct from other segments of the plurality of segments serving as segment display screens on the flexible display screen.

Example 5 includes the subject matter of Example 1, wherein the contents comprise a plurality of content portions, wherein each segment of the plurality of segments to display one or more content portions of the plurality of content portions, wherein the one or more content portions are different from other content portions of the plurality of content portions displayed via other segments of the plurality of segments.

Example 6 includes the subject matter of Example 1 or 2, further comprising preferences logic to facilitate maintenance of user preferences provided by a user associated with the flexible display screen.

Example 7 includes the subject matter of Example 1, wherein the contents are displayed via the plurality of segments based on the user preferences, wherein the user preferences include personal settings relating to one or more of display adjustments, content selections, and interactivity settings.

Example 8 includes the subject matter of Example 1, wherein the flexible display screen comprises at least one of a standalone flexible display screen and a device-based flexible display screen mounted on a computing device including at least one of a wearable device, smart window, smart mobile device, laptop computer, desktop computer, and server computer, wherein the device-based flexible display screen includes an extension screen of a main display screen of the computing device.

Some embodiments pertain to Example 9 that includes a method for facilitating dynamic detection and intelligent use of segmentation on flexible display screens, comprising: detecting, via one or more touch sensors, alterations in current in and around one or more areas of a flexible display screen, wherein the alterations represent pressure being applied to cause at least one of bending, rolling, and curving of the flexible display screen at the one or more areas; dividing the flexible display screen into a plurality of zones corresponding to the one or more areas, wherein dividing further includes marking a plurality of portions of the plurality of zones to serve as a plurality of segments; and facilitating displaying of contents via the plurality of segments of the flexible display screen.

Example 10 includes the subject matter of Example 9, further comprising: detecting, via one or more non-touch sensors, current charges, over a period of time, in and around the one or more areas of the flexible display screen; and measuring gradual changes in the current charges over the period of time by detecting and comparing one or more present current charges with one or more previous current charges, wherein the gradual changes represent the applied pressure.

Example 11 includes the subject matter of Example 9 or 10, further comprising: associating a plurality of user interface to the plurality of segments, wherein a user interface is associated with each of the plurality of segments; and facilitating interactivity amongst the plurality of segments.

Example 12 includes the subject matter of Example 9, wherein each segment of the plurality of segments serves as a segment display screen on the flexible display screen, wherein the segment display screen is distinct from other segments of the plurality of segments serving as segment display screens on the flexible display screen.

Example 13 includes the subject matter of Example 9, wherein the contents comprise a plurality of content portions, wherein each segment of the plurality of segments to display one or more content portions of the plurality of content portions, wherein the one or more content portions are different from other content portions of the plurality of content portions displayed via other segments of the plurality of segments.

Example 14 includes the subject matter of Example 9 or 10, further comprising facilitating maintenance of user preferences provided by a user associated with the flexible display screen.

Example 15 includes the subject matter of Example 9, wherein the contents are displayed via the plurality of segments based on the user preferences, wherein the user preferences include personal settings relating to one or more of display adjustments, content selections, and interactivity settings.

Example 16 includes the subject matter of Example 9, wherein the flexible display screen comprises at least one of a standalone flexible display screen and a device-based flexible display screen mounted on a computing device including at least one of a wearable device, smart window, smart mobile device, laptop computer, desktop computer, and server computer, wherein the device-based flexible display screen includes an extension screen of a main display screen of the computing device.

Example 17 includes at least one machine-readable medium comprising a plurality of instructions, when executed on a computing device, to implement or perform a method or realize an apparatus as claimed in any preceding examples, embodiments, or claims.

Example 18 includes at least one non-transitory or tangible machine-readable medium comprising a plurality of instructions, when executed on a computing device, to implement or perform a method or realize an apparatus as claimed in any preceding examples, embodiments, or claims.

Example 19 includes a system comprising a mechanism to implement or perform a method or realize an apparatus as claimed in any preceding examples, embodiments, or claims.

Example 20 includes an apparatus comprising means to perform a method as claimed in any preceding examples, embodiments, or claims.

Example 21 includes a computing device arranged to implement or perform a method or realize an apparatus as claimed in any preceding examples, embodiments, or claims.

Example 22 includes a communications device arranged to implement or perform a method or realize an apparatus as claimed in any preceding examples, embodiments, or claims.

Some embodiments pertain to Example 23 includes a system comprising a storage device having instructions, and a processor to execute the instructions to facilitate a mechanism to perform one or more operations comprising: detecting, via one or more touch sensors, alterations in current in and around one or more areas of a flexible display screen, wherein the alterations represent pressure being applied to cause at least one of bending, rolling, and curving of the flexible display screen at the one or more areas; dividing the flexible display screen into a plurality of zones corresponding to the one or more areas, wherein dividing further includes marking a plurality of portions of the plurality of zones to serve as a plurality of segments; and facilitating displaying of contents via the plurality of segments of the flexible display screen.

Example 24 includes the subject matter of Example 23, wherein the one or more operations further comprise: detecting, via one or more non-touch sensors, current charges, over a period of time, in and around the one or more areas of the flexible display screen; and measuring gradual changes in the current charges over the period of time by detecting and comparing one or more present current charges with one or more previous current charges, wherein the gradual changes represent the applied pressure.

Example 25 includes the subject matter of Example 23 or 24, wherein the one or more operations further comprise: associating a plurality of user interface to the plurality of segments, wherein a user interface is associated with each of the plurality of segments; and facilitating interactivity amongst the plurality of segments.

Example 26 includes the subject matter of Example 23, wherein each segment of the plurality of segments serves as a segment display screen on the flexible display screen, wherein the segment display screen is distinct from other segments of the plurality of segments serving as segment display screens on the flexible display screen.

Example 27 includes the subject matter of Example 23, wherein the contents comprise a plurality of content portions, wherein each segment of the plurality of segments to display one or more content portions of the plurality of content portions, wherein the one or more content portions are different from other content portions of the plurality of content portions displayed via other segments of the plurality of segments.

Example 28 includes the subject matter of Example 23 or 24, wherein the one or more operations further comprise facilitating maintenance of user preferences provided by a user associated with the flexible display screen.

Example 29 includes the subject matter of Example 23, wherein the contents are displayed via the plurality of segments based on the user preferences, wherein the user preferences include personal settings relating to one or more of display adjustments, content selections, and interactivity settings.

Example 30 includes the subject matter of Example 23, wherein the flexible display screen comprises at least one of a standalone flexible display screen and a device-based flexible display screen mounted on a computing device including at least one of a wearable device, smart window, smart mobile device, laptop computer, desktop computer, and server computer, wherein the device-based flexible display screen includes an extension screen of a main display screen of the computing device.

Some embodiments pertain to Example 31 includes an apparatus comprising: means for detecting, via one or more touch sensors, alterations in current in and around one or more areas of a flexible display screen, wherein the alterations represent pressure being applied to cause at least one of bending, rolling, and curving of the flexible display screen at the one or more areas; means for dividing the flexible display screen into a plurality of zones corresponding to the one or more areas, wherein dividing further includes marking a plurality of portions of the plurality of zones to serve as a plurality of segments; and means for facilitating displaying of contents via the plurality of segments of the flexible display screen.

Example 32 includes the subject matter of Example 31, wherein the one or more operations further comprise: means for detecting, via one or more non-touch sensors, current charges, over a period of time, in and around the one or more areas of the flexible display screen; and means for measuring gradual changes in the current charges over the period of time by detecting and comparing one or more present current charges with one or more previous current charges, wherein the gradual changes represent the applied pressure.

Example 33 includes the subject matter of Example 31 or 32, further comprising: means for associating a plurality of user interface to the plurality of segments, wherein a user interface is associated with each of the plurality of segments; and means for facilitating interactivity amongst the plurality of segments.

Example 34 includes the subject matter of Example 31, wherein each segment of the plurality of segments serves as a segment display screen on the flexible display screen, wherein the segment display screen is distinct from other segments of the plurality of segments serving as segment display screens on the flexible display screen.

Example 35 includes the subject matter of Example 31, wherein the contents comprise a plurality of content portions, wherein each segment of the plurality of segments to display one or more content portions of the plurality of content portions, wherein the one or more content portions are different from other content portions of the plurality of content portions displayed via other segments of the plurality of segments.

Example 36 includes the subject matter of Example 31 or 32, further comprising means for facilitating maintenance of user preferences provided by a user associated with the flexible display screen.

Example 37 includes the subject matter of Example 31, wherein the contents are displayed via the plurality of segments based on the user preferences, wherein the user preferences include personal settings relating to one or more of display adjustments, content selections, and interactivity settings.

Example 38 includes the subject matter of Example 31, wherein the flexible display screen comprises at least one of a standalone flexible display screen and a device-based flexible display screen mounted on a computing device including at least one of a wearable device, smart window, smart mobile device, laptop computer, desktop computer, and server computer, wherein the device-based flexible display screen includes an extension screen of a main display screen of the computing device.

Example 39 includes at least one non-transitory or tangible machine-readable medium comprising a plurality of instructions, when executed on a computing device, to implement or perform a method as claimed in any of examples, embodiments, or claims 9-16.

Example 40 includes at least one machine-readable medium comprising a plurality of instructions, when executed on a computing device, to implement or perform a method as claimed in any of examples, embodiments, or claims 9-16.

Example 41 includes a system comprising a mechanism to implement or perform a method as claimed in any of examples, embodiments, or claims 9-16.

Example 42 includes an apparatus comprising means for performing a method as claimed in any of examples, embodiments, or claims 9-16.

Example 43 includes a computing device arranged to implement or perform a method as claimed in any of examples, embodiments, or claims 9-16.

Example 44 includes a communications device arranged to implement or perform a method as claimed in any of examples, embodiments, or claims 9-16.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A mobile communication device comprising:
   an antenna;
   a flexible touchscreen having a first state and a second state, the flexible touchscreen bendable to be wearable on a wrist when in the second state;
   communication circuitry to wirelessly communicate with another device via the antenna;
   a sensor to:
      provide a first signal corresponding to a bend in the flexible touchscreen; and
      provide a second signal indicative of a transition from the first state to the second state;
   a storage device including instructions;
   processor circuitry to execute the instructions to:
      cause display of a first user interface of a first application in a first segment of the flexible touchscreen in response to the transition from the first state to the second state, the first segment on a first side of the bend; and
      cause display of a second user interface of a second application in a second segment of the flexible touchscreen on a second side of the bend, the first application being different from the second application, the first segment and the second segment separated along the bend in the flexible touchscreen.

2. A mobile communication device as defined in claim 1, wherein the first segment and the second segment are separated along an axis of the bend.

3. A mobile communication device as defined in claim 1, wherein the flexible touchscreen includes the sensor.

4. A mobile communication device as defined in claim 1, wherein the flexible touchscreen includes a plurality of sensors.

5. A mobile communication device as defined in claim 1, wherein the mobile communication device operates as a phone in a flat state.

6. A mobile communication device as defined in claim 5, wherein the first state is a flat state.

7. A mobile communication device as defined in claim 1, wherein the second state includes a plurality of neighboring bends and the bend is located at an apex of the plurality of neighboring bends.

8. A mobile communication device as defined in claim 1, wherein the second state includes a curve.

9. A mobile communication device as defined in claim 8, wherein the bend is located at the apex of the curve.

10. A mobile communication device as defined in claim 1, wherein the processor circuitry is to execute the instructions to: cause display of a third user interface of a third application in a third segment of the flexible touchscreen in, the first segment on a first side of a second bend and the third segment on a second side of the second bend.

11. A mobile communication device as defined in claim 1, wherein the first signal and the second signal are the same.

12. A non-transitory computer readable medium storing instructions that, when executed, cause a machine to at least:
   cause display of a first user interface of a first application in a first segment of a flexible touchscreen in response to a transition of the flexible touchscreen from a first state to a second state, the first segment on a first side of an axis of a bend detected in the flexible touchscreen, the flexible touchscreen having the first state and the second state, the flexible touchscreen bendable to be wearable on a wrist when in the second state; and
   cause display of a second user interface of a second application in a second segment of the flexible touchscreen on a second side of the axis of the bend, the first application being different from the second application, the first segment and the second segment separated along the axis of the bend in the flexible touchscreen, the machine including communication circuitry to wirelessly communicate with another device via an antenna of the machine.

13. A non-transitory computer readable medium as defined in claim 12, wherein instructions, when executed, cause the machine to detect a location of the axis of the bend based on a signal from a sensor.

14. A non-transitory computer readable medium as defined in claim 13, wherein the flexible touchscreen includes the sensor to provide the signal corresponding to the bend in the flexible touchscreen.

15. A non-transitory computer readable medium as defined in claim 12, wherein the flexible touchscreen includes a plurality of sensors.

16. A non-transitory computer readable medium as defined in claim 12, wherein the machine operates as a phone in a flat state.

17. A non-transitory computer readable medium as defined in claim 12, wherein the first state is a flat state.

18. A non-transitory computer readable medium as defined in claim 12, wherein instructions, when executed, cause the machine to detect a plurality of neighboring bends.

19. A non-transitory computer readable medium as defined in claim 12, wherein instructions, when executed, cause the machine to detect a plurality of neighboring bends and to detect the axis of the bend at an apex of the plurality of neighboring bends.

20. A non-transitory computer readable medium as defined in claim 12, wherein instructions, when executed, cause the machine to detect a curve, wherein the bend is located at an apex of the curve.

* * * * *